US012612334B2

(12) United States Patent
Vilinska et al.

(10) Patent No.: US 12,612,334 B2
(45) Date of Patent: Apr. 28, 2026

(54) GYPSUM WALLBOARD HAVING MULTIPLE BLENDED SURFACTANTS

(71) Applicant: KNAUF GIPS KG, Iphofen (DE)

(72) Inventors: Annamaria Vilinska, Chicago, IL (US); Alfred C. Li, Naperville, IL (US)

(73) Assignee: KNAUF GIPS KG, Iphofen (DE)

( * ) Notice: Subject to any disclaimer, the term of this patent is extended or adjusted under 35 U.S.C. 154(b) by 812 days.

(21) Appl. No.: 17/807,966

(22) Filed: Jun. 21, 2022

(65) Prior Publication Data

US 2023/0002278 A1 Jan. 5, 2023

Related U.S. Application Data

(60) Provisional application No. 63/214,049, filed on Jun. 23, 2021.

(51) Int. Cl.

| | |
|---|---|
| ***B32B 9/00*** | (2006.01) |
| ***C04B 14/36*** | (2006.01) |
| ***C04B 24/16*** | (2006.01) |
| *C04B 103/40* | (2006.01) |
| *C04B 111/00* | (2006.01) |

(52) U.S. Cl.

CPC ............ *C04B 14/365* (2013.01); *C04B 24/16* (2013.01); *C04B 2103/40* (2013.01); *C04B 2111/0062* (2013.01)

(58) Field of Classification Search

CPC .................................................... C04B 14/365
USPC .......................................................... 428/408
See application file for complete search history.

(56) References Cited

U.S. PATENT DOCUMENTS

| | | | |
|---|---|---|---|
| 2,017,022 | A | 10/1935 | Roos |
| 2,080,009 | A | 5/1937 | Roos |
| 3,573,947 | A | 4/1971 | Kincade |
| 4,203,788 | A | 5/1980 | Clear |
| 4,488,909 | A | 12/1984 | Galer et al. |
| 4,504,335 | A | 3/1985 | Galer |
| 4,518,652 | A | 5/1985 | Willoughby |
| 4,916,004 | A | 4/1990 | Ensminger et al. |
| 5,643,510 | A | 7/1997 | Sucech |
| 5,683,635 | A | 11/1997 | Sucech et al. |
| 6,342,284 | B1 | 1/2002 | Yu et al. |
| 6,409,825 | B1 | 6/2002 | Yu et al. |
| 6,494,609 | B1 | 12/2002 | Wittbold et al. |
| 6,632,550 | B1 | 10/2003 | Yu et al. |
| 6,815,049 | B2 | 11/2004 | Veeramasuneni et al. |

(Continued)

FOREIGN PATENT DOCUMENTS

| | | | |
|---|---|---|---|
| WO | 2009/025988 | A1 | 2/2009 |
| WO | 2014/172469 | A2 | 10/2014 |
| WO | 2016/205170 | A1 | 12/2016 |

OTHER PUBLICATIONS

International Search Report and Written Opinion received for PCT/EP2022/025289, mailed Oct. 13, 2022.

*Primary Examiner* — Daniel H Miller

(74) *Attorney, Agent, or Firm* — Pradip Sahu; Greer, Burns & Crain, Ltd

(57) ABSTRACT

A gypsum board is provided, including, a set gypsum core disposed between two cover sheets, the set gypsum core including a gypsum crystal matrix formed from at least water, stucco, and a foam, and the foam is formed from a blend of a first surfactant, a second surfactant and a third surfactant and water. Each surfactant is a distinct composition from the other surfactants.

12 Claims, 2 Drawing Sheets

(56) References Cited

U.S. PATENT DOCUMENTS

| | | | |
|---|---|---|---|
| 6,822,033 B2 | 11/2004 | Yu et al. | |
| 6,869,474 B2 | 3/2005 | Perez-Pena et al. | |
| 7,364,676 B2 | 4/2008 | Sucech et al. | |
| 7,811,685 B2 | 10/2010 | Wang et al. | |
| 8,070,878 B2 | 12/2011 | Dubey | |
| 8,323,785 B2 | 12/2012 | Yu et al. | |
| 10,399,899 B2 | 9/2019 | Sang et al. | |
| 10,421,250 B2 | 9/2019 | Li et al. | |
| 10,919,808 B2 | 2/2021 | Sang et al. | |
| 2007/0048490 A1 | 3/2007 | Yu et al. | |
| 2010/0247937 A1 | 9/2010 | Liu et al. | |
| 2016/0031761 A1 | 2/2016 | Munie et al. | |
| 2020/0392050 A1* | 12/2020 | Li | C04B 41/4535 |

* cited by examiner

GYPSUM WALLBOARD HAVING MULTIPLE BLENDED SURFACTANTS

RELATED APPLICATION

The present application is a Non-Provisional of, and claims 35 U.S.C. 119 priority from, U.S. Ser. No. 63/214,049 filed Jun. 23, 2021, the contents of which are incorporated by reference herein.

BACKGROUND

The present application relates generally to the production of gypsum wallboard panels and more specifically to an improved technique for producing foam for use in wallboard slurries.

Set gypsum (i.e., calcium sulfate dihydrate) is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum primarily in the form of calcium sulfate hemihydrate), water, and other ingredients as appropriate are mixed, typically in a pin mixer or a pinless mixer as the terms are used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is typically used (e.g., in a kiln) to drive off the remaining free (i.e., unreacted) water to yield a dry product.

A reduction in board weight is desired because of higher efficiencies in installation. For example, lifting demands are significantly reduced, which results in longer work days and less injuries. Lighter weight board is also more "green," as it can result in reducing transportation expenditures and energy consumption. To reduce the weight of the board, foaming agent can be introduced into the slurry to form air voids in the final product. However, by their nature, foaming agents are generally unstable such that foam bubbles tend to break up easily, particularly in the presence of cementitious material, thereby leading to waste and inefficiencies.

Furthermore, replacing mass with air in the gypsum board envelope reduces weight, but in many cases, that loss of mass also results in less strength. Compensating for that loss in strength is a significant obstacle in weight reduction efforts in the art.

It is known to mix alkyl sulfates and alkyl ether sulfates as surfactants for producing foam that is injected into gypsum wallboard slurries. As the industry moves to more lightweight boards, there has been a reduction in the amount of pregelatinized starch in the slurry. It is believed that the reduction in pregelatinized starch has also been a factor in a noted instability of foam performance and the desired bubble generation in the board core. As such, board designers face a new challenge in the formulation of foam with desired bubble generation characteristics in modern, reduced weight core slurries.

SUMMARY

In one aspect, the disclosure addresses the above-described need for a technique for enhancing the production of desired foam in modern, reduced-weight/low density gypsum wallboard core slurries. The present core slurry features a blend of at least three surfactants which are combined as needed in respective amounts for generating the desired unstable foam. The combined foam includes multiple surfactants, each having relatively shorter chains (less than or equal to C12) which are pumped and delivered independently into a soap mixing tube. Contents of the mixing tube are then mixed with water and the foam is blended with the slurry for forming a low density gypsum wallboard. An improved wallboard panel is provided, as is a process for producing low density wallboard slurries with enhanced foam bubble size.

In the preferred embodiment, the foam is generated through the use of three surfactants. A first surfactant or foaming agent or soap is also referred to as an unstable soap, such as an alkyl sulfate having an average carbon chain length of about 10. Examples of such unstable soaps include Polystep® B25M, Polystep® B29M, Vinapor® Gyp 80 surfactant, and Hyonic® 25AM/FM. A second surfactant or foaming agent or soap is blended with the first surfactant, and is also referred to as a stable soap such as an alkyl ether sulfate. Commercial examples of stable soaps are Steol® FA 403M, Steol® CS 230 and Hyonic® 33 PFM. A third surfactant or soap, is an alkyl sulfate, alkyl ether sulfate, alkyl ether carboxylate, alkylbenzene sulfonate, alkyl sulfosuccinate, alkyl phosphate, alkyl ether phosphate, fatty alcohol ethoxylate, alkylphenol ethoxylate, fatty acid ethoxylate, fatty amine ethoxylate, fatty amine ethoxylate, alkyl glucoside, sorbitan alkanoate, alkyl quat, dialkyl quat, ester quat, betaine, amidobetaine, or imidazoline. In an embodiment, the third surfactant is preferably octyl sulfate. The third surfactant preferably has a different head group chemistry and/or a different carbon chain length than the first and second surfactants. As is known in surfactant chemistry, the head group refers to the hydrophilic part of a surfactant molecule, which also includes a tail or hydrophobic part.

All three surfactants are preferably pumped and delivered independently via separate delivery tubes into a soap mixing tube, after which they are blended with water to form foam. Next, the foam is blended with the gypsum slurry to form a low density gypsum wallboard using delivery means that are well known in the art.

An objective of the present disclosure is that the surfactant blend chemistries and foaming properties are adjusted to create a less or more stable foam, depending on the desired bubble size and wallboard formulation. Adding the inventive, different surfactant chemistries compared to industry standards will change the interactions among the surfactants to create a foam with enhanced or reduced coalescing properties. Further, by blending the above-described three surfactants together, operators have the capability of tailoring foam stability to meet the requirements of specific wallboard slurry formulations.

In another aspect, the disclosure provides a slurry including water, stucco, and a blend of three surfactants, wherein, when the slurry is cast and dried as board, the board has increased strength compared to the same board formed with fewer surfactants.

In another aspect, the disclosure provides a method of forming a foamed structure in a cementitious slurry, e.g., used in the preparation of cementitious (e.g., gypsum or cement) board. In the method, three surfactants are blended together and mixed with water to create a foaming agent which generates bubbles. A foam is generated from the blended aqueous soap mixture. The foam is added to a gypsum or cement slurry including cementitious material (e.g., stucco or cement) and water to form a foamed cementitious slurry. Without wishing to be bound by any particular theory, it is believed that, as the foam is entrained in the cementitious slurry, foam bubbles are formed with a shell surrounding the bubbles interfacing the slurry. It is further believed that the blending of the three surfactants provides an overall shorter chain surfactant blend which results in more unstable foam, and accordingly, larger bubbles and the resulting voids in the resulting wallboard panels.

To make the board, the foamed cementitious slurry is applied in a bonding relation to a top (or face) cover sheet to form a foamed cementitious core slurry having first and second major surfaces. The first major surface of the foamed cementitious core slurry faces the top cover sheet. A bottom (or back) cover sheet is applied in bonding relation to the second major surface of the foamed cementitious core slurry to form a wet assembly of board precursor. If desired, a skim coat can be applied between the core and either or both of the cover sheets. The board precursor is cut and dried to form the board product.

In another aspect, the disclosure provides cement board formed from a core mix of water and a cement material (e.g., Portland cement, alumina cement, magnesia cement, etc., and blends of such materials). A foaming agent formed from the above-described three surfactants is also included in the mix. Optionally, in an embodiment, fatty alcohol, lightweight aggregate (e.g., expanded clay, expanded slag, expanded shale, perlite, expanded glass beads, polystyrene beads, and the like) is included in the mix. The cement board includes a cement core disposed between two cover sheets. The cement core can be formed from at least water, cement, foaming agent, and a fatty alcohol.

More specifically, a gypsum board is provided, including, a set gypsum core disposed between two cover sheets, the set gypsum core including a gypsum crystal matrix formed from at least water, stucco, and a foam, and the foam is formed from a blend of a first surfactant, a second surfactant and a third surfactant and water. Each surfactant is a distinct composition from the other surfactants.

In a preferred embodiment, the third surfactant has a shorter carbon chain length than the first surfactant and the second surfactant. It is preferred that the first surfactant is an alkyl sulfate. More preferably, the first surfactant is one of Polystep® B25M and Hyonic® 25AM or Hyonic® 25FM surfactants.

In a preferred embodiment, the second surfactant is an alkyl ether sulfate having an average carbon chain length of about 9 to 13. More preferably, the second surfactant is one of Steol® FA 403M, Steol® CS 230 and Hyonic® 33 PFM.

Referring now to the third surfactant, an alkyl sulfate is preferred having a shorter length carbon chain than the first and second surfactants. The third surfactant is preferably taken from the group listed above. A preferred choice for the third surfactant is octyl sulfate, cocamidopropyl betaine or decyl glucoside.

In another embodiment, a gypsum board is provided, including a set gypsum core disposed between two cover sheets, the set gypsum core having a gypsum crystal matrix formed from at least water, stucco, and a foam. The foam is formed from a blend of a first surfactant, a second surfactant and a third surfactant and water, wherein each surfactant is a distinct composition from the other surfactants. Preferably, the first surfactant is an alkyl sulfate, the second surfactant is an alkyl ether sulfate, and the third surfactant is a surfactant distinct from the first surfactant and second surfactant by having different functional groups or different carbon chain length than the first surfactant and the second surfactant.

In still another embodiment, a process for producing low density gypsum wallboard panels is provided, including, providing a first surfactant, providing a second surfactant, providing a third surfactant, blending the first surfactant, the second surfactant and the third surfactant with water in a mixing tube to form foam, and blending the foam with a wallboard slurry for forming a low density gypsum wallboard.

DETAILED DESCRIPTION

Figure 1:
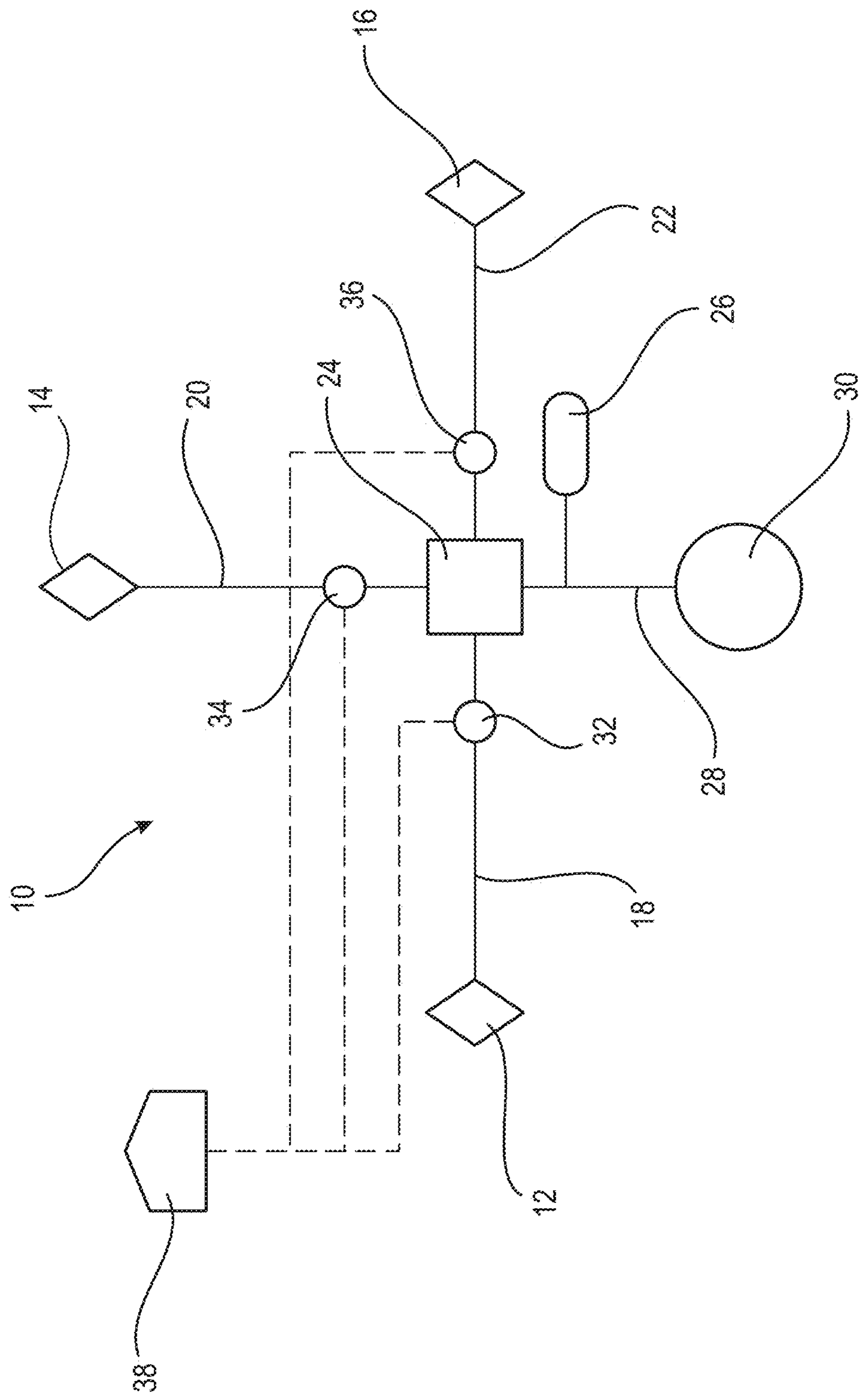
FIG. 1 is a schematic representation of the present system for blending foam constituents.

Embodiments of the disclosure provide an enhanced blended foam useful for cementitious slurries (e.g., gypsum or cement slurries), and for related products and methods. Gypsum and cement slurries can be complex systems with varying types and amounts of materials. The ingredients within the slurry contribute stress to foam, which can cause foam bubbles to break up, resulting in reduced control of air void size distribution.

Surprisingly and unexpectedly, the inventors have found that by blending multiple surfactants, the amount of foaming action can be adjusted to accommodate the particular requirements of low density gypsum wallboard slurries. By making the desired adjustments to the foam structure, certain benefits known in the art can be obtained, including, for example, improved board strength, as seen in, e.g., improved nail pull resistance (sometimes referred to simply as "nail pull"), core hardness, etc. The air void size distribution of the core structure can be tailored as desired, e.g., to have an average void diameter that can be higher or lower, e.g., comprising larger air voids or smaller air voids and/or a preferred combination of large and small void sizes, as can be predetermined.

As is known in the art, gypsum wallboard is produced by providing stucco (i.e., calcined gypsum primarily in the form of calcium sulfate hemihydrate), water, and other ingredients as appropriate which are mixed, typically in a pin or pinless mixer as the terms are used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is typically used (e.g., in a kiln) to drive off the remaining free (i.e., unreacted) water to yield a dry product.

The present disclosure relates to an improved formulation of foam that is used to create voids in the gypsum slurry. In the present disclosure, foam is formed from a blend of a first surfactant, a second surfactant and a third surfactant and water. Notably, each surfactant is a distinct composition from the other surfactants. In a preferred embodiment, the third surfactant has a shorter carbon chain length than the first surfactant and the second surfactant.

In the preferred formulation, the first surfactant is an alkyl sulfate. More specifically, the first surfactant is preferably one of Polystep® B25M surfactant produced by Stepan Chemical Company, Northfield, IL, and Hyonic® 25AM or Hyonic® 25FM surfactant, produced by GEO Specialty Chemicals, Ambler, Pa.

Next, the second surfactant is an alkyl ether sulfate. More specifically, the second surfactant is one of Steol® FA 403M surfactant, Steol® CS 230 surfactant produced by Stepan Chemical Company, Northfield, IL, and Hyonic® 33 PFM surfactant produced by GEO Specialty Chemicals, Ambler, Pa.

Referring now to the third surfactant, preferably this foam component has a different head group chemistry and/or a different carbon chain length than the carbon chain lengths of the first and second surfactants. It is contemplated that the third surfactant is taken from the group including alkyl sulfate, alkyl ether sulfate, alkyl ether carboxylate, alkylbenzene sulfonate, alkyl sulfosuccinate, alkyl phosphate, alkyl ether phosphate, fatty alcohol ethoxylate, alkylphenol ethoxylate, fatty acid ethoxylate, fatty amine ethoxylate, fatty amine ethoxylate, alkyl glucoside, sorbitan alkanoate, alkyl quat, dialkyl quat, ester quat, betaine, amidobetaine, and imidazoline. More preferably, the third surfactant is octyl sulfate, cocamidopropyl betaine or decyl glucoside.

Referring now to FIG. 1, which schematically represents a preferred system for producing the present foam, generally designated 10, a first surfactant as described above is provided from a suitable reservoir 12. A second surfactant as described above, is provided from a suitable reservoir 14, and a third surfactant as described above is provided from a suitable reservoir 16. Each of the reservoirs 12, 14, 16 is connected via a respective supply conduit 18, 20, 22 to a mixing tube or vessel 24, in which the three surfactants 12, 14, 16 are blended together. The combined surfactants are mixed with a source of water 26 to form the present foam, which is then added via a conduit 28 to a conventional gypsum slurry mixer 30, well known in the art. In the present disclosure, it is contemplated that the gypsum slurry in the mixer 30 is formulated to produce a relatively low density, lightweight gypsum wallboard.

Operator control of valves 32, 34, 36 on the respective surfactant supply conduits 18, 20, 22 via a control module 38 as known in the art allows for customized blending of the first, second and third surfactants as desired for a particular gypsum slurry formulation.

Laboratory results in which the third surfactant 16 represented 50% of the total surfactants in the foam composition provided a threefold increase in average bubble size.

In some embodiments, the present foaming agent, preferably including the first, second and third surfactants as described above, includes a stable soap, an unstable soap, or a combination of stable and unstable soaps. In some embodiments, one component of the foaming agent is a stable soap, and the other component is a combination of a stable soap and unstable soap.

Many commercially known foaming agents are available and can used in accordance with embodiments of the disclosure, such as the HYONIC line (e.g., 25AS) of soap products from GEO Specialty Chemicals, Ambler, Pa. Other commercially available soaps include Polystep® B25 surfactant from Stepan Chemical Company, Northfield, IL. The foaming agents described herein can be used alone or in combination with other foaming agents.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths, can be, for example, $C_9$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap with an alkyl chain length of 8-12 carbon atoms and an alkoxy (e.g., ethoxy) group chain length of 1-4 units. The second foaming agent is optionally an unalkoxylated (e.g., unethoxylated) soap with an alkyl chain length of 6-20 carbon atoms, e.g., 6-18 carbon atoms or 6-16 carbon atoms. Regulating the respective amounts of these two soaps allows for control of the board foam structure until about 100% stable soap or about 100% unstable soap is reached.

The foaming agent is included in the gypsum slurry in any suitable amount. For example, in some embodiments, it is included in an amount of from about 0.01% to about 0.25% by weight of the stucco, e.g., from about 0.01% to about 0.1% by weight of the stucco, from about 0.01% to about 0.3% by weight of the stucco, or from about 0.07% to about 0.1% by weight of the stucco.

In some embodiments, a fatty alcohol is incorporated into the foaming agent. If included, the fatty alcohol is contemplated as being any suitable aliphatic fatty alcohol. It will be understood that, as defined herein throughout, "aliphatic" refers to alkyl, alkenyl, or alkynl, and can be substituted or unsubstituted, branched or unbranched, and saturated or unsaturated, and in relation to some embodiments, is denoted by the carbon chains set forth herein, e.g., $C_x$-$C_y$, where x and y are integers. The term aliphatic thus also refers to chains with heteroatom substitution that preserves the hydrophobicity of the group. The fatty alcohol can be a single compound, or can be a combination of two or more compounds.

In some embodiments, the fatty alcohol is a $C_6$-$C_{20}$ fatty alcohol, such as a $C_{10}$-$C_{20}$ fatty alcohol or $C_6$-$C_{16}$ fatty alcohol (e.g., $C_6$-$C_{14}$, $C_6$-$C_{12}$, $C_6$-$C_{10}$, $C_6$-$C_8$, $C_8$-$C_{16}$, $C_8$-$C_{14}$, $C_8$-$C_{12}$, $C_8$-$C_{10}$, $C_{10}$-$C_{16}$, $C_{10}$-$C_{14}$, $C_{10}$-$C_{12}$, $C_{12}$-$C_{16}$, $C_{12}$-$C_{14}$, or $C_{14}$-$C_{16}$ aliphatic fatty alcohol, etc.). Examples include octanol, decanol, dodecanol, etc. or any combination thereof.

The $C_{10}$-$C_{20}$ fatty alcohol comprises a linear or branched $C_6$-$C_{20}$ carbon chain and at least one hydroxyl group. The hydroxyl group can be attached at any suitable position on the carbon chain but is preferably at or near either terminal carbon. In certain embodiments, the hydroxyl group can be attached at the .alpha.-, .beta.-, or .gamma.-position of the carbon chain, for example, the $C_6$-$C_{20}$ fatty alcohol can comprise the following structural subunits:

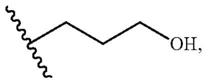,
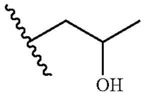, or
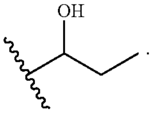.

Thus, examples of a desired fatty alcohol in accordance with some embodiments are 1-dodecanol, 1-undecanol, 1-decanol, 1-nonanol, 1-octanol, or any combination thereof.

In some embodiments, a foam stabilizing agent comprises the fatty alcohol and is essentially free of fatty acid alkyloamides or carboxylic acid taurides. In some embodiments, the foam stabilizing agent is essentially free of a glycol, although glycols can be included in some embodiments, e.g., to allow for higher surfactant content. Essentially free of any of the aforementioned ingredients means that the foam stabilizer contains either (i) 0 wt. % based on the weight of any of these ingredients, or (ii) an ineffective or (iii) an immaterial amount of any of these ingredients. An example of an ineffective amount is an amount below the threshold amount to achieve the intended purpose of using any of these ingredients, as one of ordinary skill in the art will appreciate. An immaterial amount may be, e.g., below about 0.00001 wt. %, such as below about 0.000005 wt. %, below about 0.000001 wt. %, below about 0.0000001 wt. %, etc., based on the weight of stucco, as one of ordinary skill in the art will appreciate.

The fatty alcohol can be present in the gypsum slurry in any suitable amount. In some embodiments, the fatty alcohol is present in an amount of from about 0.0001% to about 0.03% by weight of the stucco, e.g., from about 0.0001% to about 0.001% by weight of the stucco, from about 0.0002% to about 0.0075% by weight of the stucco, from about 0.0001% to about 0.003% by weight of the stucco, or from about 0.0005% to about 0.001% by weight of the stucco.

In preferred embodiments, to enhance efficiency, the foaming agent, foam water, and fatty alcohol are combined prior to addition to the gypsum slurry. Preparation in this manner enables the fatty alcohol to act directly with the foam to provide the desired stabilization effect, rather than be diluted in the gypsum slurry and compete with other components of the slurry for access to foam bubbles.

When included, the fatty alcohol can be added to foaming agent and typically dissolved. Since fatty alcohols are generally water insoluble, they are added to the soap and solubilized first prior to foam generation in some embodiments. The fatty alcohol can be dissolved in stable or unstable foaming agents in accordance with embodiments of the disclosure. In some embodiments, a first foaming agent, with dissolved fatty alcohol, is then blended with another foaming agent (e.g., a stable foaming agent with a dissolved fatty alcohol blended with an unstable foaming agent, or an unstable foaming agent with a dissolved fatty alcohol blended with a stable foaming agent).

Any effective weight proportion between the surfactants (foaming agents) and optional fatty alcohols can be used in the final foaming agent-fatty alcohol blend, prior to addition to the gypsum slurry. For example, the foaming agent can be present relative to fatty alcohol in a weight ratio of from about 5000:1 to about 5:1, e.g., from about 5000:1 to about 1000:1, from about 500:1 to about 100:1, or from about 500:1 to about 10:1. To illustrate, in one embodiment, a typical final foaming agent-fatty alcohol blend has 30% surfactants and 1% fatty alcohols by weight, with the remainder of the mixture composed of water.

The foaming agent (and optional fatty alcohol) can be blended in a container by mixing (stirring, agitation). The additional foaming agent can be added by injection. In accordance with preferred embodiments, the foam is pregenerated and prestabilized before it meets the cementitious slurry. While not wishing to be bound by theory, when the fatty alcohol is provided, it is believed that a thin film of surfactant is formed which is modified with fatty alcohol before mixing it with the cementitious slurry. Pregeneration of the foam involves high shear mixing of pressurized air with soap solution. This pregeneration of foaming agent is preferred as it leads to a foam, which is in contrast with systems that merely entrain some air during mixing without making foams. These air entrainment systems merely add bubbles by simply blending the slurry containing some soap. A foam can be distinguished from such mixed bubble systems because pregenerated foam bubble size is more uniform and can be controlled.

After the foaming agent composition blend with optional fatty alcohol is mixed together, the foam is generated and then added (e.g., injected) to the slurry. Methods and apparatus for generating foam are well known. See, e.g., U.S. Pat. Nos. 4,518,652; 2,080,009; and 2,017,022. For example, the final composition of the foaming agent (and optional fatty alcohol) combination can be directed via dosage adjustments to the foam generator equipment. One method of making the foam is using a foam generator that mixes the soap solution with air. Any method of mixing can be used to combine the soap with air that causes bubbles to be formed, including agitation, turbulent flow or mixing. For example, the foam generator equipment can include compressed air and surfactant solution mixed in order to generate the foam. The amount of water and air are controlled to generate foam of a particular density. Adjustment of the foam volume is used to control the overall dry product weight.

If desired, a mixture of foaming agents can be pre-blended "off-line", i.e., separate from the process of preparing the foamed gypsum product. However, it is preferable to blend the first and second foaming agents concurrently and continuously, as an integral "on-line" part of the mixing process. This can be accomplished, for example, by pumping separate streams of the different foaming agents and bringing the streams together at, or just prior to, a foam generator that is employed to generate the stream of aqueous foam which is then inserted into and mixed with the calcined gypsum slurry. By blending in this manner, the ratio of the first and second foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. Nos. 5,643,510 and 5,683,635, incorporated by reference.

The slurry and pregenerated foam can be combined to make a foamed gypsum composition. One method of combining the gypsum slurry and the pregenerated foam is by pressurizing the foam and forcing it into the slurry. One method of combining the foam and the slurry is by addition of the foam directly to the mixer. In one embodiment, a foam ring injecting apparatus is oriented to inject foam into the discharge conduit of the mixer. This process is described in U.S. Pat. No. 5,683,635, incorporated by reference. Other methods of injecting foam into the slurry are contemplated and known in the art. Regardless of the way that the foam is generated or introduced into the slurry, an important feature of the present method is that the fatty alcohol is combined or added at some point in the foam production or generation prior to its introduction into the slurry. The gypsum composition is shaped to form a gypsum core.

The gypsum crystal matrix of the set gypsum core formed with the fatty alcohol and foaming agent regime of the disclosure can be tailored to have any desired pore size distribution. Soap usage differs from product to product depending on the desired void size and distribution, as will be appreciated by one of ordinary skill in the art. Techniques for adjusting void sizes as desired are well known and will be understood by one of ordinary skill in the art. See, e.g., U.S. Pat. No. 5,643,510 and US 2007/0048490. For example, void size distribution of the foamed gypsum core can be finely controlled by adjusting the concentration of the soaps in the aqueous soap mixture. After a foamed gypsum core has been prepared, inspection of the interior of the gypsum core reveals the void structure. Changes in the void size distribution are produced by varying the soap concentration from the initial or previous concentration. If the interior has too large a fraction of small voids, the soap concentration in the aqueous soap mixture can be reduced. If too many very large, oblong or irregularly shaped voids are found, the soap concentration can be increased. Although the optimum void size distribution may vary by product, location or raw materials used, this process technique is useful to move towards the desired void size distribution, regardless of how it is defined. The desirable void size distribution in many embodiments is one that produces a high strength core for the gypsum formulation being used.

For example, in some embodiments, the set gypsum core comprises air voids having an average air void diameter of relatively large air voids, such as an average air void diameter of at least about 100 microns in diameter, an average air void diameter of at least about 150 microns in diameter, an average air void diameter of at least about 200 microns in diameter, an average air void diameter of at least about 250 microns in diameter, an average air void diameter of at least about 300 microns in diameter, or an average air void diameter of at least about 350 microns in diameter, etc.

In some embodiments, the set gypsum core comprises air voids having an average air void diameter of relatively small air voids, such as an average air void diameter of less than about 100 microns in diameter, an average air void diameter of less than about 90 microns in diameter, an average air void diameter of less than about 80 microns in diameter, an air average void diameter of less than about 70 microns in diameter, an average air void diameter of less than about 60 microns in diameter, or an average air void diameter of less than about 50 microns in diameter, etc.

In some embodiments, the gypsum crystal matrix has a pore size distribution comprising voids, wherein the air void size having greatest frequency is a diameter of about 100 microns or less, about 80 microns or less, about 70 microns or less, or about 50 microns or less. In other embodiments, the gypsum crystal matrix has a pore size distribution comprising air voids, wherein the air void size having greatest frequency is a diameter of at least about 100 microns, such as a diameter of at least about 150 microns, at least about 200 microns, etc.

In some embodiments, to enhance strength, the set gypsum core includes a significant void volume contributed by large voids, i.e., having a diameter of at least about 100 microns. For example, in some embodiments, at least about 20% of the total void volume of the set gypsum core is contributed by voids having a diameter of at least about 100 microns, such as at least about 30% of the total void volume of the set gypsum core, at least about 40% of the total void volume of the set gypsum core, at least about 50% of the total void volume of the set gypsum core, at least about 60% of the total void volume of the set gypsum core, at least about 70% of the total void volume of the set gypsum core, at least about 80% of the total void volume of the set gypsum core, or at least about 90% of the total void volume of the set gypsum core. To enhance weight reduction while maintaining strength, in some embodiments, smaller generally discrete air voids at high frequency, i.e., having a diameter of less than about 100 microns and/or having a diameter of less than about 50 microns, can be disposed between the large voids. In some embodiments, the air void size having greatest frequency is a diameter of about 100 microns or less, about 80 microns or less, about 70 microns or less, or about 50 microns or less, while at the same time the void volume contribution by air voids having a diameter of at least about 100 microns can be any according to any of the volume percentages stated above. In some embodiments, the distribution of air voids is relatively narrow, which can be characterized by image analysis of micrographs or other images of the core structure.

As used herein, the term average air void size (also referred to as the average air void diameter) is calculated from the largest diameter of individual air voids in the core. The largest diameter is the same as the Feret diameter. The largest diameter of each air void can be obtained from an image of a sample. Images can be taken using any suitable technique, such as scanning electron microscopy (SEM), which provides two-dimensional images. A large number of pore sizes of air voids can be measured in an SEM image, such that the randomness of the cross sections (pores) of the voids can provide the average diameter. Taking measurements of voids in multiple images randomly situated throughout the core of a sample can improve this calculation. Additionally, building a three-dimensional stereological model of the core based on several two-dimensional SEM images can also improve the calculation of the average void size. Another technique is X-ray CT-scanning analysis (XMT), which provides a three-dimensional image. Another technique is optical microscopy, where light contrasting can be used to assist in determining, e.g., the depth of voids. The voids can be measured either manually or by using image analysis software, e.g., ImageJ, developed by NIH. One of ordinary skill in the art will appreciate that manual determination of void sizes and distribution from the images can be determined by visual observation of dimensions of each void.

The gypsum slurry includes water and stucco. Any suitable type of stucco can be used in the gypsum slurry, including calcium sulfate alpha hemihydrate, calcium sulfate beta hemihydrate, calcium sulfate anhydrate. The stucco can be fibrous or non-fibrous. Embodiments of the disclosure can accommodate any suitable water-to-stucco ratio (WSR). In some embodiments, the WSR is from about 0.3 to about 1.5, such as, for example, from about 0.3 to about 1.3, from about 0.3 to about 1.2, from about 0.3 to about 1, from about 0.3 to about 0.8, from about 0.5 to about 1.5, from about 0.5 to about 1.3, from about 0.5 to about 1.2, from about 0.5 to about 1, from about 0.5 to about 0.8, from about 0.7 to about 1.5, from about 0.7 to about 1.3, from about 0.7 to about 1.2, from about 0.7 to about 1, from about 0.8 to about 1.5, from about 0.8 to about 1.3, from about 0.8 to about 1.2, from about 0.8 to about 1, from about 0.9 to about 1.5, from about 0.9 to about 1.3, from about 0.9 to about 1.2, from about 1 to about 1.5, from about 1 to about 1.4, from about 1 to about 1.2, etc.

Surprisingly and unexpectedly, the improved stability of foam voids, and related resultant benefits described herein, can be achieved even in the presence of various gypsum slurry additives and amounts used in forming the board core. As such, the improved modified pre-foam mix comprising foaming agent and fatty alcohol in accordance with embodiments of the disclosure can be used in the preparation of various types of gypsum products including ultra-light-weight board, mold and water-resistant board, and fire-rated products.

The gypsum slurry can include accelerators or retarders as known in the art to adjust the rate of setting. Accelerator can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

Other additives can be included in the gypsum slurry to provide desired properties, including green strength, sag resistance, water resistance, mold resistance, fire rating, thermal properties, board strength, etc. Examples of suitable additives include, for example, strength additives such as starch, dispersant, polyphosphate, high expansion particulate, heat sink additive, fibers, siloxane, magnesium oxide, etc., or any combination thereof. The use of the singular term additive herein is used for convenience but will be understood to encompass the plural, i.e., more than one additive in combination, as one of ordinary skill in the art will readily appreciate.

In some embodiments, the gypsum slurry includes a starch that is effective to increase the strength of the gypsum board relative to the strength of the board without the starch (e.g., via increased nail pull resistance). Any suitable strength enhancing starch can be used, including hydroxyalkylated starches such as hydroxyethylated or hydroxypropylated starch, or a combination thereof, or pregelatinized starches, which are generally preferred over acid-modifying migrating starches which generally provide paper-core bond enhancement but not core strength enhancement. Any suitable pregelatinized starch can be included in the enhancing additive.

If included, the starch can be present in any suitable amount. In some embodiments, the starch is present in the gypsum slurry in an amount of from about 0% to about 20% by weight of the stucco, e.g., from about 0% to about 15% by weight of stucco, from about 0% to about 10% by weight of stucco, from about 0.1% to about 20% by weight of stucco, from about 0.1% to about 15% by weight of stucco, from about 0.1% to about 10% by weight of stucco, from about 0.1% to about 6% by weight of stucco, from about 0.3% to about 4% by weight of stucco, from about 0.5% to about 4% by weight of stucco, from about 0.5% to about 3% by weight of stucco, from about 0.5% to about 2% by weight of stucco, from about 1% to about 4% by weight of stucco, from about 1% to about 3% by weight of stucco, from about 1% to about 2% by weight of stucco, etc.

The gypsum slurry can optionally include at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCEI 11, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Naphthalenesulfonate dispersants can be used to facilitate formation of larger bubbles and hence larger voids in the final product, and polycarboxylates such as polycarboxylate ethers can be used to form smaller bubbles and hence smaller voids in the product. As void structure changes to the product are desired during manufacture, such dispersant adjustments and other changes in the process can be made as one of ordinary skill will appreciate. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred, but higher molecular weight dispersants are also contemplated. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals.

If included, the dispersant can be provided in any suitable amount. In some embodiments, for example, the dispersant is present in an amount, for example, from about 0% to about 0.7% by weight of stucco, 0% to about 0.4% by weight of stucco, about 0.05% to about 5% by weight of the stucco, from about 0.05% to about 0.3% by weight of stucco, or from about 1% to about 5% by weight of stucco.

In some embodiments, the gypsum slurry can optionally include one or more phosphate-containing compounds, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}PnO_{3+1}$ wherein n=1,000-3,000, or polyphosphoric acid having two or more repeating phosphoric acid units and having the molecular formula $H_{n+2}PnO_{3+1}$ wherein n is two or more.

If included, the phosphate-containing compound can be present in any suitable amount. To illustrate, in some embodiments, the phosphate-containing compound can be present in an amount, for example, from about 0.1% to about 1%, e.g., about 0.2% to about 0.4% by weight of the stucco.

A water resistance or mold resistance additive such as siloxane optionally can be included. If included, in some embodiments, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. As described in U.S. Pat. No. 7,811,685, magnesium oxide can be included to contribute to the catalysis and/or to the mold resistance and/or water resistance in some embodiments. If included, magnesium oxide, is present in any suitable amount, such as from about 0.02% to about 0.1%, e.g., from about 0.02% to about 0.04% by weight of stucco.

In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that from about 0.05% to about 0.5%, e.g., about 0.07% to about 0.14% of the BS 94 siloxane may be used in some embodiments, based on the weight of the stucco. For example, in some embodiments, it is preferred to use from about 0.05% to about 0.2%, e.g., from about 0.09% to about 0.12% of the siloxane based on the dry stucco weight.

The gypsum slurry can include any suitable fire resistant additive in some embodiments. Examples of suitable fire resistant additives include high expansion particulates, high efficiency heat sink additives, fibers, or the like, or any combination thereof, as described in U.S. Pat. No. 8,323,785, which description of such additives is hereby incorporated by reference. Vermiculite, aluminum trihydrate, glass fibers, and a combination thereof can be used in some embodiments.

For example, the high expansion particulates useful in accordance with some embodiments can exhibit a volume expansion after heating for one hour at about 1560° F. (about 850° C.) of about 300% or more of their original volume. In some embodiments, high expansion vermiculites can be used that have a volume expansion of about 300% to about 380% of their original volume after being placed for one hour in a chamber having a temperature of about 1560° F. (about 850° C.). If included, high expansion particulate, such as vermiculite, can be present in any suitable amount. In some embodiments, it is present in an amount from about 1% to about 10%, e.g., about 3% to about 6% by weight of stucco.

Aluminum trihydrate (ATH), also known as alumina trihydrate and hydrated alumina, can increase fire resistance due to its crystallized or compound water content. ATH is a suitable example of a high efficiency heat sink additive. Such high efficiency heat sink (HENS) additives have a heat sink capacity that exceeds the heat sink capacity of comparable amounts of gypsum dihydrate in the temperature range causing the dehydration and release of water vapor from the gypsum dihydrate component of the panel core. Such additives typically are selected from compositions, such as aluminum trihydrate or other metal hydroxides that decompose, releasing water vapor in the same or similar temperature ranges as does gypsum dihydrate. While other HEHS additives (or combinations of HEHS additives) with increased heat sink efficiency relative to comparable amounts of gypsum dihydrate can be used, preferred HEHS additives provide a sufficiently-increased heat sink efficiency relative to gypsum dihydrate to offset any increase in weight or other undesired properties of the HEHS additives when used in a gypsum panel intended for fire rated or other high temperature applications. If included, heat sink additive, such as ATH, is present in any suitable amount. In some embodiments, it is included in an amount from about 1% to about 8%, e.g., from about 2% to about 4% by weight of stucco.

The fibers may include mineral fibers, carbon and/or glass fibers and mixtures of such fibers, as well as other comparable fibers providing comparable benefits to the panel. In some embodiments, glass fibers are incorporated in the gypsum core slurry and resulting crystalline core structure. The glass fibers in some of such embodiments can have an average length of about 0.5 to about 0.75 inches and a diameter of about 11 to about 17 microns. In other embodiments, such glass fibers may have an average length of about 0.5 to about 0.675 inches and a diameter of about 13 to about 16 microns. If included, fibers, such as glass fibers, is present in any suitable amount, such as, from about 0.1% to about 3%, e.g., from about 0.5% to about 1% by weight of stucco.

The gypsum board according to embodiments of the disclosure has utility in a variety of different products having a range of desired densities, including, but not limited to, drywall (which can encompass such board used not only for walls but also for ceilings and other locations as understood in the art), fire-rated board, mold-resistant board, water-resistant board, etc. Board weight is a function of thickness. Since boards are commonly made at varying thicknesses, board density is used herein as a measure of board weight. Examples of suitable thickness include ⅜ inch, one-half inch, ⅝ inch, ¾ inch, or one inch. The advantages of the gypsum board in accordance with embodiments of the disclosure can be seen at a range of densities, including up to heavier board densities, e.g., about 43 pcf or less, or 40 pcf or less, such as from about 17 pcf to about 43 pcf, from about 20 pcf to about 43 pcf, from about 24 pcf to about 43 pcf, from about 27 pcf to about 43 pcf, from about 20 pcf to about 40 pcf, from about 24 pcf to about 40 pcf, from about 27 pcf to about 40 pcf, from about 20 pcf to about 37 pcf, from about 24 pcf to about 37 pcf, from about 27 pcf to about 37 pcf, from about 20 pcf to about 35 pcf, from about 24 pcf to about 35 pcf, from about 27 pcf to about 35 pcf, etc.

As noted herein, removing mass from gypsum wallboard has led to considerable difficulty in compensating for the concomitant loss in strength. In view of the improved foam void stability, some embodiments of the disclosure surprisingly and unexpectedly enable the use of lower weight board with good strength and/or desired fire or thermal property, lower water demand, and efficient use of additives as described herein. For example, in some embodiments, board density can be from about 17 pcf to about 35 pcf, e.g., from about 17 pcf to about 33 pcf, 17 pcf to about 31 pcf, 17 pcf to about 28 pcf, from about 20 pcf to about 32 pcf, from about 20 pcf to about 31 pcf, from about 20 pcf to about 30 pcf, from about 20 pcf to about 30 pcf, from about 20 pcf to about 29 pcf, from about 20 pcf to about 28 pcf, from about 21 pcf to about 33 pcf, from about 21 pcf to about 32 pcf, from about 21 pcf to about 33 pcf, from about 21 pcf to about 32 pcf, from about 21 pcf to about 31 pcf, from about 21 pcf to about 30 pcf, from about 21 pcf to about 29 pcf, from about 21 pcf to about 28 pcf, from about 21 pcf to about 29 pcf, from about 24 pcf to about 33 pcf, from about 24 pcf to about 32 pcf, from about 24 pcf to about 31 pcf, from about 24 pcf to about 30 pcf, from about 24 pcf to about 29 pcf, from about 24 pcf to about 28 pcf, or from about 24 pcf to about 27 pcf, etc.

The cover sheets can be in any suitable form. It will be understood that, with respect to cover sheets, the terms "face" and "top" sheets are used interchangeably herein, while the terms "back" and "bottom" are likewise used interchangeably herein. For example, the cover sheets may comprise cellulosic fibers, glass fibers, ceramic fibers, mineral wool, or a combination of the aforementioned materials. One or both of the sheets may comprise individual sheets or multiple sheets. In preferred embodiments, the cover sheets comprise a cellulosic fiber. For example, paper sheet, such as Manila paper or kraft paper, can be used as the back sheet. Useful cover sheet paper includes Manila 7-ply and NewsLine 3-ply, or 7-ply available from United States Gypsum Company, Chicago, Ill.; Grey-Back 3-ply and Manila Ivory 3-ply, available from International Paper, Newport, Ind.; and Manila heavy paper and MH Manila HT (high tensile) paper, available from United States Gypsum Company, Chicago, Ill. An example of cover sheet paper is 5-ply NewsLine.

In addition, the cellulosic paper can comprise any other material or combination of materials. For example, one or both sheets, particularly the face (top) sheet can include polyvinyl alcohol, boric acid, or polyphosphate as described herein (e.g., sodium trimetaphosphate) to enhance the strength of the paper. In some embodiments, the paper can be contacted with a solution of one or more of polyvinyl alcohol, boric acid, and/or polyphosphate so that the paper is at least partially wetted. The paper can be at least partially saturated in some embodiments. The polyvinyl alcohol, boric acid and/or boric acid can penetrate the fibers in the paper in some embodiments. The solution of polyvinyl alcohol, boric acid, and/or polyphosphate can be in any suitable amount and can be applied in any suitable manner as will be appreciated in the art. For example, the solution can be in the form of from about 1% to about 5% solids by weight in water of each ingredient present between the polyvinyl alcohol, the boric acid and/or polyphosphate, which can be added in one solution or if desired in multiple solutions.

In some embodiments, one or both sheets can comprise glass fibers, ceramic fibers, mineral wool, or a combination of the aforementioned materials. One or both sheets in accordance with the present disclosure can be generally hydrophilic, meaning that the sheet is at least partially capable of adsorbing water molecules onto the surface of the sheet and/or absorbing water molecules into the sheet.

In other embodiments, the cover sheets can be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

In some embodiments, the thermal conductivity of the top and/or bottom sheet is less than about 0.1 w/(m.k.). For example, the thermal conductivity of the top and/or bottom sheet is less than about 0.05 w/(m.k.).

If desired, in some embodiments, one or both cover sheets can optionally include any suitable amount of inorganic compound or mixture of inorganic compounds that adequately imparts greater fire endurance where such properties are sought. Examples of suitable inorganic compounds include aluminum trihydrate and magnesium hydroxide. For example, the cover sheets can comprise any inorganic compound or mixture of inorganic compounds with high crystallized water content, or any compound that releases water upon heating. In some embodiments, the amount of inorganic compound or the total mixture of inorganic compounds in the sheet ranges from about 0.1% to about 30% by weight of the sheet. The inorganic compound or inorganic compounds used in the sheet may be of any suitable particle size or suitable particle size distribution.

In some embodiments, ATH can be added in an amount from about 5% to about 30% by total weight of the sheet. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one embodiment is about 1170 Joule/gram. Without being bound by theory, it is believed that the ATH additive decomposes to release approximately 35% of the water of crystallization as water vapor when heated above 205° C. in accordance with the following equation: $Al(OH)_3 \rightarrow Al_2O_3+3H_2O$.

A cover sheet comprising inorganic particles of high water content, such as ATH, can increase fire endurance of the board. The inorganic compound or mixture of compounds is incorporated into the sheet in some embodiments. A cover sheet such as paper comprising ATH can be prepared by first diluting cellulosic fiber in water at about 1% consistency, then mixing with ATH particles at a predetermined ratio. The mixture can be poured into a mold, the bottom of which can have a wire mesh to drain off water. After draining, fiber and ATH particles are retained on the wire. The wet sheet can be transferred to a blotter paper and dried at about 200-360° F.

In some embodiments, as described for inclusion in the cover sheet or in a stucco slurry, e.g., ATH particles of less than about 20 μm are preferred, but any suitable source or grade of ATH can be used. For example, ATH can be obtained from commercial suppliers such as Huber under the brand names SB 432 (10 μm) or Hydral® 710 (1 μm).

In some embodiments, the cover sheet may comprise magnesium hydroxide. In these embodiments, the magnesium hydroxide additive preferably has a heat of decomposition greater than about 1000 Joule/gram, such as about 1350 Joule/gram, at or above 180° C. to 205° C. In such embodiments, any suitable magnesium hydroxide can be used, such as that commercially available from suppliers, including Akrochem Corp. of Akron, Ohio.

In other embodiments, the cover sheets be "substantially free" of inorganic compounds such as ATH, magnesium hydroxide, or a mixture thereof, which means that the cover sheets contain either (i) 0 wt. % based on the weight of the sheet, or no such inorganic compounds such as ATH, magnesium hydroxide, or a mixture thereof, or (ii) an ineffective or (iii) an immaterial amount of inorganic compounds such as ATH, magnesium hydroxide, or a mixture thereof. An example of an ineffective amount is an amount below the threshold amount to achieve the intended purpose of using inorganic compounds such as ATH, magnesium hydroxide, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.1 wt. %, below about 0.05 wt. %, below about 0.01 wt. %, etc.

The cover sheets can also have any suitable total thickness. In some embodiments, at least one of the cover sheets has a relatively high thickness, e.g., a thickness of at least about 0.014 inches. In some embodiments, it is preferred that there is an even higher thickness, e.g., at least about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. Any suitable upper limit for these ranges can be adopted, e.g., an upper end of the range of about 0.030 inches, about 0.027 inches, about 0.025 inches, about 0.024 inches, about 0.023 inches, about 0.022 inches, about 0.021 inches, about 0.020 inches, about 0.019 inches, about 0.018 inches, etc. The total sheet thickness refers to the sum of the thickness of each sheet attached to the gypsum board.

The cover sheets can have any suitable density. For example, in some embodiments, at least one or both of the cover sheets has a density of at least about 36 pcf, e.g., from about 36 pcf to about 46 pcf, such as from about 36 pcf to about 44 pcf, from about 36 pcf to about 42 pcf, from about 36 pcf to about 40 pcf, from about 38 pcf to about 46 pcf, from about 38 pcf to about 44 pcf, from about 38 pcf to about 42 pcf, etc.

The cover sheet can have any suitable weight. For example, in some embodiments, lower basis weight cover sheets (e.g., formed from paper) such as, for example, at least about 33 lbs/MSF (e.g., from about 33 lbs/MSF to about 65 lbs/MSF, from about 33 lbs/MSF to about 60 lbs/MSF, 33 lbs/MSF to about 58 lbs/MSF from about 33 lbs/MSF to about 55 lbs/MSF, from about 33 lbs/MSF to about 50 lbs/MSF, from about 33 lbs/MSF to about 45 lbs/MSF, etc., or less than about 45 lbs/MSF) can be utilized in some embodiments. In other embodiments, one or both cover sheets have a basis weight from about 38 lbs/MSF to about 65 lbs/MSF, from about 38 lbs/MSF to about 60 lbs/MSF, from about 38 lbs/MSF to about 58 lbs/MSF, from about 38 lbs/MSF to about 55 lbs/MSF, from about 38 lbs/MSF to about 50 lbs/MSF, from about 38 lbs/MSF to about 45 lbs/MSF.

However, if desired, in some embodiments, even heavier basis weights can be used, e.g., to further enhance nail pull resistance or to enhance handling, e.g., to facilitate desirable "feel" characteristics for end-users. Thus, one or both of the cover sheets can have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MSF to about 65 lbs/MSF, from about 50 lbs/MSF to about 60 lbs/MSF, etc.). If desired, in some embodiments, one cover sheet (e.g., the "face" paper side when installed) can have the aforementioned higher basis weight, e.g., to enhance nail pull resistance and handling, while the other cover sheet (e.g., the "back" sheet when the board is installed) can have somewhat lower weight basis if desired (e.g., weight basis of less than about 60 lbs/MSF, e.g., from about 33 lbs/MSF to about 55 lbs/MSF, from about 33 lbs/MSF to about 50 lbs/MSF, from about 33 lbs/MSF to about 45 lbs/MSF, or from about 33 lbs/MSF to about 40 lbs/MSF).

In some embodiments, the gypsum board product exhibits fire resistance beyond what is found in conventional wallboard. To achieve fire resistance, the board can optionally be formed from certain additives that enhance fire resistance in the final board product, as described herein. Some fire resistant board is considered "fire rated" when the board passes certain tests while in an assembly.

In accordance with some embodiments, gypsum board is configured to meet or exceed a fire rating pursuant to the fire containment and structural integrity requirements of the wallboard industry. Examples of fire rating assemblies known in the art are UL U305, U419 and U423. Other equivalent fire test procedures and standards, e.g., in which the board contains fire resistant additives discussed herein are also known in the art. The present disclosure thus provides gypsum board (e.g., reduced weight and density at thickness of ½ inch or ⅝ inch), and methods for making the same, that are capable of satisfying fire ratings (e.g., 17 min., 20 min., 30 min., ¾ hour, one-hour, two-hour, etc.) pursuant to the fire containment and structural integrity procedures and standards of various UL assemblies such as those discussed herein, in some embodiments.

The gypsum board can be tested, e.g., in an assembly according to Underwriters Laboratories UL U305, U419, and U423 specifications and any other fire test procedure that is equivalent to any one of those fire test procedures. It should be understood that reference made herein to a particular fire test procedure of Underwriters Laboratories, such as, UL U305, U419, and U423, for example, also includes a fire test procedure, such as one promulgated by any other entity, that is equivalent to the particular UL standard in question.

For example, the gypsum board in some embodiments is effective to inhibit the transmission of heat through an assembly constructed in accordance with any one of UL Design Numbers U305, U419 or U423, the assembly having a first side with a single layer of gypsum panels and a second side with a single layer of gypsum panels. Surfaces of gypsum boards on the first side of the assembly are heated in accordance with the time-temperature curve of ASTM E119-09a, while surfaces of gypsum panels on the second side of the assembly are provided with temperature sensors pursuant to ASTM E119-09a. In some embodiments of fire resistant board, when heated, the maximum single value of the temperature sensors is less than about 325° F. plus ambient temperature after about 50 minutes, and/or or the average value of the temperature sensors is less than about 250° F. plus ambient temperature after about 50 minutes. In some embodiments, the board has a density of about 40 pounds per cubic foot or less. Desirably, the board has good strength as described herein, such as a core hardness of at least about 11 pounds (5 kg), e.g., at least about 13 pounds (5.9 kg), or at least about 15 pounds (6.8 kg).

In some embodiments, when the surfaces on the first side of the assembly of fire resistant gypsum board with fire resistant additive in the concentrated layer are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated the maximum single value of the temperature sensors is less than about 325° F. plus ambient temperature after about 60 minutes and/or the average value of the temperature sensors is less than about 250° F. plus ambient temperature after about 60 minutes. In other embodiments, when the surfaces of gypsum panels on the first side of the assembly are heated, the maximum single value of the temperature sensors is less than about 325° F. plus ambient temperature after about 50 minutes, and/or the average value of the temperature sensors is less than about 250° F. plus ambient temperature after about 50 minutes. In other embodiments, when the surfaces of gypsum panels on the first side of the assembly are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum panels on the first side of the assembly are heated, the maximum single value of the temperature sensors is less than about 325° F. plus ambient temperature after about 60 minutes, and the average value of the temperature sensors is less than about 250° F. plus ambient temperature after about 60 minutes.

In some embodiments, fire resistant gypsum board with fire resistant additive in the concentrated layer is effective to inhibit the transmission of heat through the assembly when constructed in accordance with UL Design Number U305 so as to achieve a one-hour fire rating under ASTM E119-09a. In some embodiments, the board is effective to inhibit the transmission of heat through the assembly when constructed in accordance with UL Design Number U419 so as to achieve a one-hour fire rating under ASTM E119-09a. In some embodiments, the gypsum board is effective to inhibit the transmission of heat through the assembly when constructed in accordance with UL Design Number U423 so as to achieve a one-hour fire rating under ASTM E119-09a. In some embodiments, the board has a Thermal Insulation Index (TI) of about 20 minutes or greater and/or a High Temperature Shrinkage (S) of about 10%. In some embodiments, the board has a ratio of High Temperature Thickness Expansion (TE) to S (TE/S) of about 0.2 or more.

Furthermore, in some embodiments, the gypsum board can be in the form of reduced weight and density, fire resistant gypsum board with High Temperature Shrinkage of less than about 10% in the x-y directions (width-length) and High Temperature Thickness Expansion in the z-direction (thickness) of greater than about 20% when heated to about 1560° F. (850° C.). In yet other embodiments, when used in wall or other assemblies, such assemblies have fire testing performance comparable to assemblies made with heavier, denser commercial fire rated panels. In some embodiments, the High Temperature Shrinkage of the panels typically is less than about 10% in the x-y directions (width-length). In some embodiments, the ratio of z-direction High Temperature Thickness Expansion to x-y High Temperature Shrinkage is at least about 2 to over about 17 at 1570° F. (855° C.).

In some embodiments, a fire resistant gypsum board formed according to principles of the present disclosure, and the methods for making same, can provide a panel that exhibits an average shrink resistance of about 85% or greater when heated at about 1800° F. (980° C.) for one hour. In other embodiments, the gypsum board exhibits an average shrink resistance of about 75% or greater when heated at about 1800° F. (980° C.) for one hour.

The gypsum layers between the cover sheets can be effective to provide a Thermal Insulation Index (TI) of about 20 minutes or greater. The board can have a desired density (D) as described herein. The gypsum layers between the cover sheets can be effective to provide the gypsum board with a ratio of TIM of about 0.6 minutes/pounds per cubic foot (0.038 minutes/(kg/m.sup.3)) or more.

In some embodiments, gypsum board made according to the disclosure meets test protocols according to ASTM Standard C473-10. For example, in some embodiments, when the board is cast at a thickness of ½ inch, the board has a nail pull resistance of at least about 65 $lb_f$ (pounds force, which is sometimes referred to as simply "lb." or "lbs" for convenience by those of ordinary skill in the art, who understand this is a measurement of force) as determined according to ASTM C473-10 (method B), e.g., at least about 68 $lb_f$, at least about 70 $lb_f$, at least about 72 $lb_f$, at least about 74 $lb_f$, at least about 75 $lb_f$, at least about 76 $lb_f$, at least about 77 $lb_f$, etc. In various embodiments, the nail pull resistance can be from about 65 $lb_f$ to about 100 $lb_f$, from about 65 $lb_f$ to about 95 $lb_f$, from about 65 $lb_f$ to about 90 $lb_f$, from about 65 $lb_f$ to about 85 $lb_f$, from about 65 $lb_f$ to about 80 $lb_f$, from about 65 $lb_f$ to about 75 $lb_f$, from about 68 $lb_f$ to about 100 lb$_f$, from about 68 lb$_f$ to about 95 lb$_f$, from about 68 lb$_f$ to about 90 lb$_f$, from about 68 lb$_f$ to about 85 lb$_f$, from about 68 lb$_f$ to about 80 lb$_f$, from about 70 lb$_f$ to about 100 lb$_f$, from about 70 lb$_f$ to about 95 lb$_f$, from about 70 lb$_f$ to about 90 lb$_f$, from about 70 lb$_f$ to about 85 lb$_f$, from about 70 lb$_f$ to about 80 lb$_f$, from about 72 lb$_f$ to about 100 lb$_f$, from about 72 lb$_f$ to about 95 lb$_f$, from about 72 lb$_f$ to about 90 lb$_f$, from about 72 lb$_f$ to about 85 lb$_f$, from about 72 lb$_f$ to about 80 lb$_f$, from about 72 lb$_f$ to about 77 lb$_f$, from about 72 lb$_f$ to about 75 lb$_f$, from about 75 lb$_f$ to about 100 lb$_f$, from about 75 lb$_f$ to about 95 lb$_f$, from about 75 lb$_f$ to about 90 lb$_f$, from about 75 lb$_f$ to about 85 lb$_f$, from about 75 lb$_f$ to about 80 lb$_f$, from about 75 lb$_f$ to about 77 lb$_f$, from about 77 lb$_f$ to about 100 lb$_f$, from about 77 lb$_f$ to about 95 lb$_f$, from about 77 lb$_f$ to about 90 lb$_f$, from about 77 lb$_f$ to about 85 lb$_f$, or from about 77 lb$_f$ to about 80 lb$_f$.

With respect to flexural strength, in some embodiments, when cast in a board of one-half inch thickness, the board has a flexural strength of at least about 36 lb$_f$ in a machine direction (e.g., at least about 38 lb$_f$, at least about 40 lb$_f$, etc) and/or at least about 107 lb$_f$ (e.g., at least about 110 lb$_f$, at least about 112 lb$_f$, etc.) in a cross-machine direction as determined according to the ASTM standard C473-10, method B. In various embodiments, the board can have a flexural strength in a machine direction of from about 36 lb$_f$ to about 60 lb$_f$, e.g., from about 36 lb$_f$ to about 55 lb$_f$, from about 36 lb$_f$ to about 50 lb$_f$, from about 36 lb$_f$ to about 45 lb$_f$, from about 36 lb$_f$ to about 40 lb$_f$, from about 36 lb$_f$ to about 38 lb$_f$, from about 38 lb$_f$ to about 60 lb$_f$, from about 38 lb$_f$ to about 55 lb$_f$, from about 38 lb$_f$ to about 50 lb$_f$, from about 38 lb$_f$ to about 45 lb$_f$, from about 38 lb$_f$ to about 40 lb$_f$, from about 40 lb$_f$ to about 60 lb$_f$, from about 40 lb$_f$ to about 55 lb$_f$, from about 40 lb$_f$ to about 50 lb$_f$, or from about 40 lb$_f$ to about 45 lb$_f$. In various embodiments, the board can have a flexural strength in a cross-machine direction of from about 107 lb$_f$ to about 130 lb$_f$, e.g., from about 107 lb$_f$ to about 125 lb$_f$, from about 107 lb$_f$ to about 120 lb$_f$, from about 107 lb$_f$ to about 115 lb$_f$, from about 107 lb$_f$ to about 112 lb$_f$, from about 107 lb$_f$ to about 110 lb$_f$, from about 110 lb$_f$ to about 130 lb$_f$, from about 110 lb$_f$ to about 125 lb$_f$, from about 110 lb$_f$ to about 120 lb$_f$, from about 110 lb$_f$ to about 115 lb$_f$, from about 110 lb$_f$ to about 112 lb$_f$, from about 112 lb$_f$ to about 130 lb$_f$, from about 112 lb$_f$ to about 125 lb$_f$, from about 112 lb$_f$ to about 120 lb$_f$, or from about 112 lb$_f$ to about 115 lb$_f$.

In addition, in some embodiments, board can have an average core hardness of at least about 11 lb$_f$, e.g., at least about 12 lb$_f$, at least about 13 lb$_f$, at least about 14 lb$_f$, at least about 15 lb$_f$, at least about 16 lb$_f$, at least about 17 lb$_f$, at least about 18 lb$_f$, at least about 19 lb$_f$, at least about 20 lb$_f$, at least about 21 lb$_f$, or at least about 22 lb$_f$, as determined according to ASTM C473-10, method B. In some embodiments, board can have a core hardness of from about 11 lb$_f$ to about 25 lb$_f$, e.g., from about 11 lb$_f$ to about 22 lb$_f$, from about 11 lb$_f$ to about 21 lb$_f$, from about 11 lb$_f$ to about 20 lb$_f$, from about 11 lb$_f$ to about 19 lb$_f$, from about 11 lb$_f$ to about 18 lb$_f$, from about 11 lb$_f$ to about 17 lb$_f$, from about 11 lb$_f$ to about 16 lb$_f$, from about 11 lb$_f$ to about 15 lb$_f$, from about 11 lb$_f$ to about 14 lb$_f$, from about 11 lb$_f$, to about 13 lb$_f$, from about 11 lb$_f$ to about 12 lb$_f$, from about 12 lb$_f$ to about 25 lb$_f$, from about 12 lb$_f$ to about 22 lb$_f$, from about 12 lb$_f$ to about 21 lb$_f$, from about 12 lb$_f$ to about 20 lb$_f$, from about 12 lb$_f$ to about 19 lb$_f$, from about 12 lb$_f$ to about 18 lb$_f$, from about 12 lb$_f$ to about lb$_f$, from about 12 lb$_f$ to about 16 lb$_f$, from about 12 lb$_f$ to about 15 lb$_f$, from about 12 lb$_f$ to about 14 lb$_f$, from about 12 lb$_f$ to about 13 lb$_f$, from about 13 lb$_f$ to about 25 lb$_f$, from about 13 lb$_f$ to about 22 lb$_f$, from about 13 lb$_f$ to about 21 lb$_f$, from about 13 lb$_f$ to about 20 lb$_f$, from about 13 lb$_f$ to about 19 lb$_f$, from about 13 lb$_f$ to about 18 lb$_f$, from about 13 lb$_f$ to about 17 lb$_f$, from about 13 lb$_f$ to about 16 lb$_f$, from about 13 lb$_f$ to about 15 lb$_f$, from about 13 lb$_f$ to about 14 lb$_f$, from about 14 lb$_f$ to about 25 lb$_f$, from about 14 lb$_f$ to about 22 lb$_f$, from about 14 lb$_f$ to about 21 lb$_f$, from about 14 lb$_f$ to about 20 lb$_f$, from about 14 lb$_f$ to about 19 lb$_f$, from about 14 lb$_f$ to about 18 lb$_f$, from about 14 lb$_f$ to about 17 lb$_f$, from about 14 lb$_f$ to about 16 lb$_f$, from about 14 lb$_f$ to about 15 lb$_f$, from about 15 lb$_f$ to about 25 lb$_f$, from about 15 lb$_f$ to about 22 lb$_f$, from about 15 lb$_f$ to about 21 lb$_f$, from about 15 lb$_f$ to about 20 lb$_f$, from about 15 lb$_f$ to about 19 lb$_f$, from about 15 lb$_f$ to about 18 lb$_f$, from about 15 lb$_f$ to about 17 lb$_f$, from about 15 lb$_f$ to about 16 lb$_f$, from about 16 lb$_f$ to about 25 lb$_f$, from about 16 lb$_f$ to about 22 lb$_f$, from about 16 lb$_f$ to about 21 lb$_f$, from about 16 lb$_f$ to about 20 lb$_f$, from about 16 lb$_f$ to about 19 lb$_f$, from about 16 lb$_f$ to about 18 lb$_f$, from about 16 lb$_f$ to about 17 lb$_f$, from about 17 lb$_f$ to about 25 lb$_f$, from about 17 lb$_f$ to about 22 lb$_f$, from about 17 lb$_f$ to about 21 lb$_f$, from about 17 lb$_f$ to about 20 lb$_f$, from about 17 lb$_f$ to about 19 lb$_f$, from about 17 lb$_f$ to about 18 lb$_f$, from about 18 lb$_f$ to about 25 lb$_f$, from about 18 lb$_f$ to about 22 lb$_f$, from about 18 lb$_f$ to about 21 lb$_f$, from about 18 lb$_f$ to about 20 lb$_f$, from about 18 lb$_f$ to about 19 lb$_f$, from about 19 lb$_f$ to about 25 lb$_f$, from about 19 lb$_f$ to about 22 lb$_f$, from about 19 lb$_f$ to about 21 lb$_f$, from about 19 lb$_f$ to about 20 lb$_f$, from about 21 lb$_f$ to about 25 lb$_f$, from about 21 lb$_f$ to about 22 lb$_f$, or from about 22 lb$_f$ to about 25 lb$_f$.

Product according to embodiments of the disclosure can be made on typical manufacturing lines known in the art. Typical board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., a pin or pinless mixer), where they are agitated to form the gypsum slurry. The mixer comprises a main body and a discharge conduit or outlet. Foaming agent can be added in the discharge outlet of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a board precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

In some embodiments, the fatty alcohol of the invention can be used to stabilize the foaming agent of the board core in a composite board having a concentrated layer as described in U.S. Pat. No. 10,421,250 incorporated herein by reference. For example, the fatty alcohol and foaming agent can be used to prepare the low density board core, with additives more concentrated in the concentrated layer, using the ingredients, amounts, board dimensions, and methods of productions described in U.S. Pat. No. 10,421,250.

In some embodiments, the fatty alcohol can be used in cement board products. The cement can be formed from a core mix of water and a cement material (e.g., Portland cement, alumina cement, magnesia cement, etc., and blends of such materials). A foaming agent and the fatty alcohol is also included in the mix. Optionally, light-weight aggregate (e.g., expanded clay, expanded slag, expanded shale, perlite, expanded glass beads, polystyrene beads, and the like) can be included in the mix in some embodiments. Other additives that can be used in forming the cement board include, for example, dispersant, fiber (e.g., glass, cellulosic, PVC, etc.), accelerator, retarder, pozzolanic material, calcium sulfate hemihydrate (e.g., calcium sulfate alpha hemihydrate), filler, etc., or combinations thereof.

The fatty alcohol can be used in a method of forming foamed cement slurry. The method comprises, consists of, or consists essentially of combining foaming agent with fatty alcohol to form an aqueous soap mixture; generating a foam from the aqueous soap mixture; and adding the foam to a cement slurry comprising cement (e.g., Portland cement, alumina cement, magnesia cement, etc., or combinations thereof) and water to form the foamed cement slurry. As the foam is entrained in the cement slurry, foam bubbles are formed with a shell surrounding the bubbles interfacing the slurry. Without wishing to be bound by any particular theory, the presence of fatty alcohol is believed to desirably stabilize the shell at the interface. Other additives can also be added to the cement slurry, such as, for example, dispersant, fiber (e.g., glass, cellulosic, PVC, etc.), accelerator, retarder, pozzolanic material, calcium sulfate hemihydrate (e.g., calcium sulfate alpha hemihydrate), filler, etc., or combinations thereof. Methods of preparing cement boards (and additives included therein) are described in, for example, U.S. Pat. Nos. 4,203,788; 4,488,909; 4,504,335; 4,916,004; 6,869,474; and 8,070,878.

The cement slurry comprising, consisting, or consisting essentially of water, cement, foaming agent, and a fatty alcohol can have increased strength compared to the same board formed without the fatty alcohol, when the slurry is formed and dried as board.

Dry and wet ingredients were introduced separately into a mixer to form a stucco slurry (sometimes called a gypsum slurry). The slurry was discharged onto a moving paper cover sheet traveling on a conveyor so that slurry spread to form a core over the paper. A dense skim coat was applied onto the paper cover sheet with the use of a roller. Dense slurry traveled around the edges of the roller to form the edges of the board. A second cover sheet was applied to the core to form a sandwich structure of a board precursor in the form of a long, continuous ribbon. The ribbon was allowed to set, and was cut, kiln dried, and processed to form the final board product.

Referring now to Tables 1-3, test results of the above-described triple surfactant-generated foam were conducted in the manufacture of wallboard panels. Regarding the board formulations, besides adding varied surfactants as described above, the amount of starch in the board was reduced compared to control samples. Starch A is an acid modified starch with mid-range viscosity of the type disclosed in commonly-assigned U.S. Pat. No. 10,399,899, the contents of which are incorporated by reference herein. Starch B is an acid modified native starch of the type disclosed in commonly-assigned U.S. Pat. No. 10,919,808, the contents of which are incorporated by reference herein. LC211 is a commercially available highly acid modified starch manufactured by Archer Daniels Midland.

Regarding the surfactants in the tests, "third soap" refers to Polystep® B29M produced by Stepan Chemical Company, Northfield, IL (Examples 1 and 2), or Vinapor® Gyp 80 surfactant manufactured by BASF (Example 3), both of which are octyl sulfate based surfactants. The unstable soap is an alkyl sulfate such as Polystep® B25, or Hyonic 25AS or FM. The stable soap is a distinct alkyl ether sulfate from the second, unstable soap. The preferred stable soap is alkyl ether sulfate based, which is Steol FA403M or Hyonic PFM33. Each one of these surfactant blends are unique and different, either due to a unique headgroup chemistry, or a unique carbon chain characteristic.

In the tests, besides the starches, dispersant, soaps and total water, the boards had the same formulations, including the paper, HRA, retarder and the like.

The tests reveal that employing the three distinct surfactants provided wallboard panels with equivalent Nail Pull values (within 3-5 pounds) of the control samples. In multiple cases, the air void size distribution also significantly changed, while no major formulation changes were made when a three soap system was used, as presented in Images 1 to 3. All images were recorded at the same magnification.

TABLE 1

| | Example 1 | |
|---|---|---|
| | Control | With Third Soap |
| Stucco | 1021 | 1023 |
| Total Water | 813 | 871 |
| WSR | 80% | 85% |
| Starch A | 6 | 6 |
| Dispersant | 2.4 | 0 |
| Total Soap | 0.65 | 0.77 |
| Third Soap | 0.00 | 0.50 |
| Unstable Soap | 0.55 | 0.23 |
| Stable Soap | 0.10 | 0.04 |
| Dry Weight (lb/MSF) | 1297 | 1314 |
| Nail Pull (lbf) | 69.7 | 72.5 |

TABLE 2

| | Example 2 | |
|---|---|---|
| | Control | With Third Soap |
| Stucco | 1023 | 1023 |
| Total Water | 737 | 747 |

TABLE 2-continued

| | Example 2 | |
|---|---|---|
| | Control | With Third Soap |
| WSR | 72% | 73% |
| Starch B | 6 | 6 |
| Dispersant | 4 | 1 |
| Total Soap | 0.55 | 0.70 |
| Third Soap | 0.00 | 0.42 |
| Unstable Soap | 0.47 | 0.21 |
| Stable Soap | 0.08 | 0.07 |
| Dry Weight (lb/MSF) | 1340 | 1334 |
| Nail Pull (lbf) | 75.0 | 74.6 |

TABLE 3

| | Example 3 | |
|---|---|---|
| | Control | With Third Soap |
| Stucco | 1022 | 1022 |
| Total Water | 802 | 788 |
| WSR | 78% | 77% |
| Starch B | 7 | 7 |
| Dispersant | 3.6 | 1.5 |
| Total Soap | 0.62 | 0.71 |
| Third Soap | 0.00 | 0.50 |
| Unstable Soap | 0.37 | 0.21 |
| Stable Soap | 0.25 | 0.01 |
| Dry Weight (lb/MSF) | 1324 | 1331.67 |
| Nail Pull (lbf) | 79.4 | 81.1 |

Figure 2A:
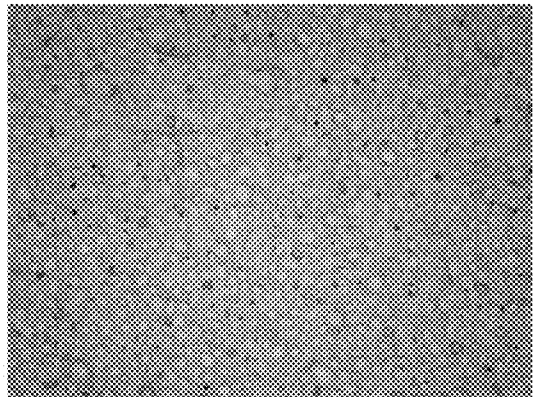
FIGS. 2A and 2B is a Microviewer image of the gypsum cores from Example 1, control formulation on the left side 2A, and Third soap condition on the right side 2B.
Figure 2B:
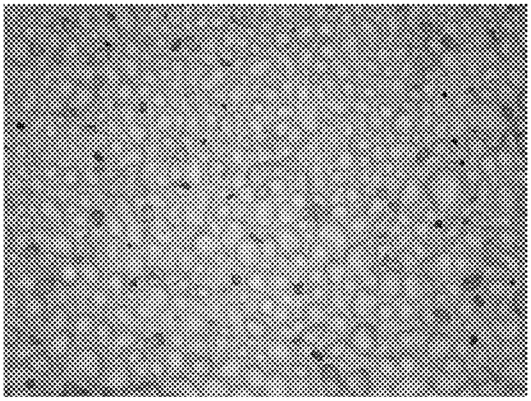
Figure 3A:
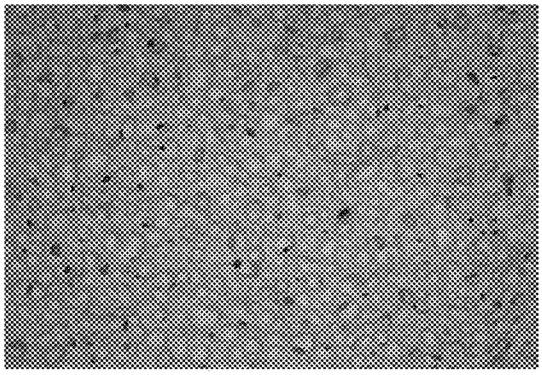
FIGS. 3A and 3B is a Microviewer image of the gypsum cores from Example 2, control formulation on the left side (3A), and Third soap condition on the right side (3B)
Figure 3B:
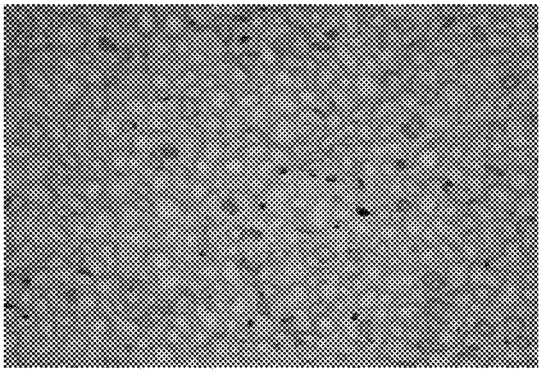
Figure 4A:
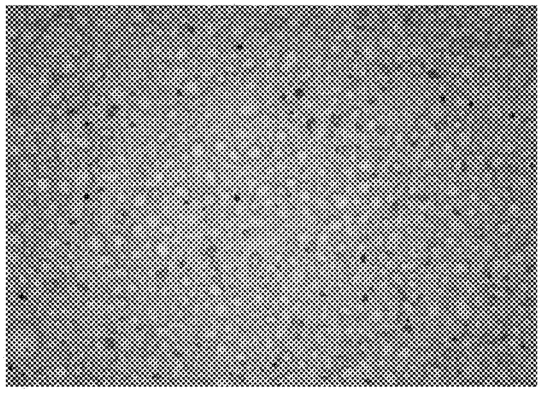
FIGS. 4A and 4B is a Microviewer image of the gypsum cores from Example 3, control formulation on the left side (4A), and Third soap condition on the right side (4B).
Figure 4B:
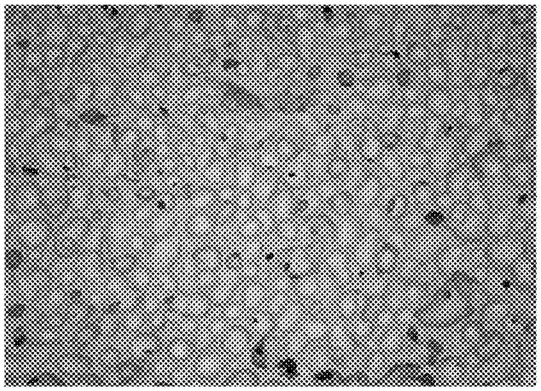

Referring now to FIGS. 2 and 3 and 4, microviewer images of Examples 1-3 are respectively shown, with the control formulation on the left side (2A, 3A, 4A) and the third soap condition on the right side (2B, 3B, 4B). The larger foam bubble size is evident when using the third soap.

While a particular embodiment of the present gypsum wallboard having multiple blended surfactants has been described herein, it will be appreciated by those skilled in the art that changes and modifications may be made thereto without departing from the invention in its broader aspects and as set forth in the following claims.

What is claimed is:

1. A gypsum board, comprising:

a set gypsum core disposed between two cover sheets;

said set gypsum core comprising a gypsum crystal matrix formed from at least water, stucco, and a foam; and said foam is formed from a blend of a first surfactant, a second surfactant and a third surfactant and water, wherein each of said first surfactant, said second surfactant and said third surfactant are separately supplied for blending and is a distinct composition from the other surfactants, wherein said first surfactant is at least one of an alkyl sulfate and an octyl sulfate, wherein said second surfactant is an alkyl ether sulfate, and wherein said third surfactant is at least one of octyl sulfate, cocamidopropyl betaine and decyl glucoside.

2. The gypsum board of claim 1, wherein said third surfactant has at least one of a different head group chemistry and a different carbon chain length than said first surfactant and said second surfactant.

3. The gypsum board of claim 1, wherein said first surfactant is one of Polystep® B25M surfactant, Polystep® B29M surfactant, Vinapor® Gyp 80 surfactant and Hyonic® 25AM/FM surfactant.

4. The gypsum board of claim 1, wherein said second surfactant is one of Steol® FA 403M surfactant, Steol® CS 230 surfactant and Hyonic® 33 PFM surfactant.

5. The gypsum board of claim 1, wherein said third surfactant or soap is an alkyl sulfate.

6. The gypsum board of claim 1, wherein said third surfactant is one of alkyl sulfate, alkyl ether sulfate, alkyl ether carboxylate, alkylbenzene sulfonate, alkyl sulfosuccinate, alkyl phosphate, alkyl ether phosphate, fatty alcohol ethoxylate, alkylphenol ethoxylate, fatty acid ethoxylate, fatty amine ethoxylate, fatty amine ethoxylate, alkyl glucoside, sorbitan alkanoate, alkyl quat, dialkyl quat, ester quat, betaine, amidobetaine, and imidazoline.

7. A gypsum board, comprising:

a set gypsum core disposed between two cover sheets;

said set gypsum core comprising a gypsum crystal matrix formed from at least water, stucco, and a foam;

said foam is formed from a blend of a first surfactant, a second surfactant and a third surfactant and water, wherein each said surfactant is independently supplied and is controlled via a designated user-operated control valve for blending and has a distinct composition from the other surfactants;

said first surfactant is an alkyl sulfate;

said second surfactant is an alkyl ether sulfate; and said third surfactant is an alkyl sulfate distinct from said first surfactant and having one of a head group chemistry and a carbon chain length different from said first surfactant and said second surfactant.

8. The gypsum board of claim 7, wherein said third surfactant is octyl sulfate, cocamidopropyl betaine or decyl glucoside.

9. A process for producing low density gypsum wallboard panels, comprising:

providing a first surfactant;

providing a second surfactant;

providing a third surfactant;

wherein each of said first surfactant, said second surfactant and said third surfactant is a distinct composition from the other surfactants;

each of said first surfactant, said second surfactant and said third surfactant are delivered independently by separate delivery tubes using user-operated control valves for each surfactant into a soap mixing tube;

blending said first surfactant, said second surfactant and said third surfactant with water in said mixing tube to form foam; and blending said foam with a wallboard slurry for forming a low density gypsum wallboard.

10. The process of claim 9, further including:

laying a sheet of face paper on a moving conveyor;

applying said slurry and foam upon said face paper; and laying a sheet of backing paper upon said slurry and foam.

11. The gypsum board of claim 7, wherein said first surfactant is at least one of an alkyl sulfate and an octyl sulfate, wherein said second surfactant is an alkyl ether sulfate, and wherein said third surfactant is at least one of octyl sulfate, cocamidopropyl betaine and decyl glucoside.

12. The process of claim 9, wherein said first surfactant is at least one of an alkyl sulfate and an octyl sulfate, wherein said second surfactant is an alkyl ether sulfate, and wherein said third surfactant is at least one of octyl sulfate, cocamidopropyl betaine and decyl glucoside.

* * * * *